No. 763,842. PATENTED JUNE 28, 1904.
C. A. BEHLEN.
VEHICLE SPRING.
APPLICATION FILED AUG. 21, 1903.
NO MODEL.

WITNESSES
INVENTOR
Charles A. Behlen

No. 763,842.

Patented June 28, 1904.

UNITED STATES PATENT OFFICE.

CHARLES A. BEHLEN, OF OXFORD, NORTH CAROLINA.

VEHICLE-SPRING.

SPECIFICATION forming part of Letters Patent No. 763,842, dated June 28, 1904.

Application filed August 21, 1903. Serial No. 170,257. (No model.)

*To all whom it may concern:*

Be it known that I, CHARLES A. BEHLEN, of Oxford, Granville county, North Carolina, have invented a new and useful Vehicle-Spring, of which the following is a full, clear, and exact description, reference being had to the accompanying drawings, forming part of this specification, in which—

Figure 1:
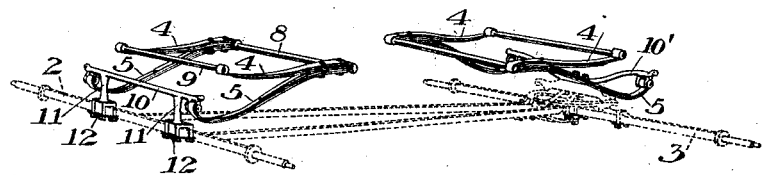
Figure 2:
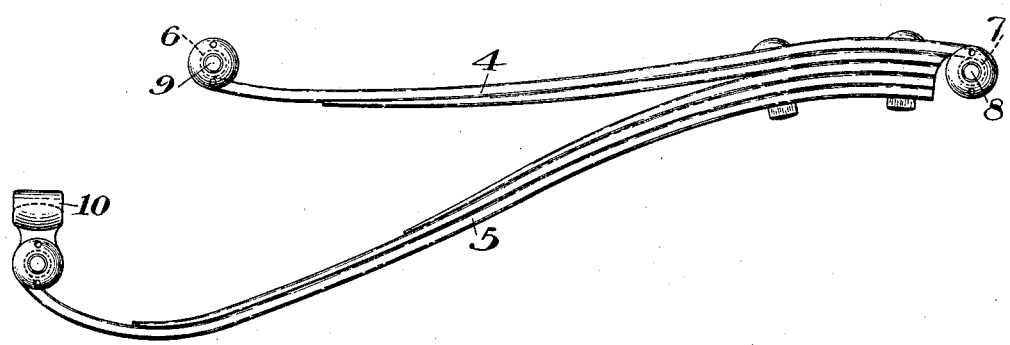
Figure 3:
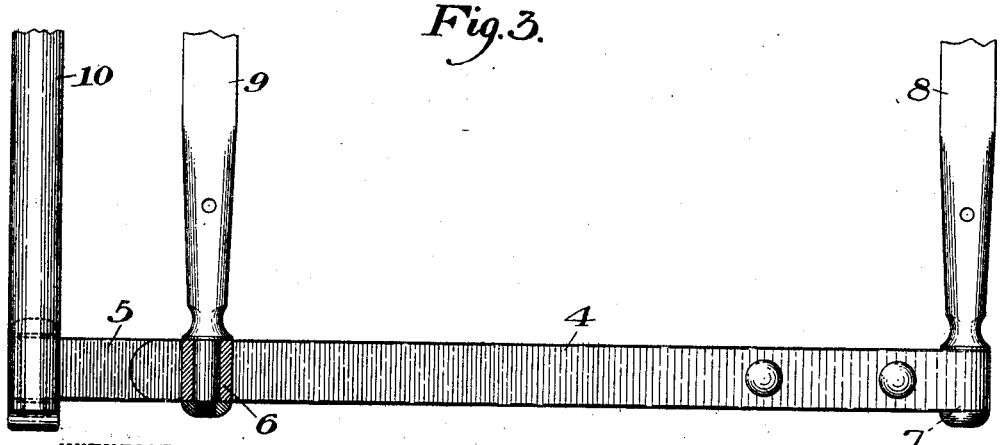

Figure 1 is a perspective view of the running-gear of a vehicle provided with my improved springs. Fig. 2 is a side elevation of one set of springs on a larger scale. Fig. 3 is a plan view of Fig. 2, partly in horizontal section.

The purpose of my invention is to provide a vehicle-spring of improved character, light in construction, and affording a better spring action than heretofore. My spring is also neat and attractive in appearance and operates without danger of breaking or straining the parts.

In the drawings, 2 is the rear axle, and 3 the front axle, of a vehicle, which may be a buggy or a surrey, wagon, or carriage.

The springs shown in Fig. 1 of the drawings at the front and back of the vehicle are substantially alike in construction. Referring to the spring which is applied to the rear axle, it comprises two pairs of spring-arms 4 4, 5 5, preferably parallel to each other and set at the respective sides of the vehicle. Each arm 4 is fixed to its lower leaf 5 at the inner end and has eyes 6 7 at each end, which are connected with the eyes of the upper arms on the other side of the vehicle by supporting-bars 8 9, which pass pivotally through the eyes and are held therein by nuts or otherwise. The body of the vehicle rests upon and is bolted to these bars, and, if desired, the bars being bolted to the vehicle-body may be divided and need not extend across from one spring-arm to the other. The lower arms 5 5 diverge downwardly from the upper arms and are pivotally attached at their outer ends to a suspension-bar 10, elevated above the axle by posts 11, which are clipped to the axle at 12 12, or the outer ends of the springs 5 may be secured to a shackle fastened directly to the axle. The posts, however, are preferable, as they serve to elevate the spring and provide clearance therefor and impart an artistic appearance.

The arrangement of the front spring (shown in Fig. 1) is substantially the same as that of the rear spring, the suspension-bar 10', however, being secured directly to the head-block.

In operation the upper arms of the spring journal on an axis 8 9 at each end and tend to revolve thereon in opposite direction. The lower arms cushion against the upper arms, and when subjected to load they gradually approach each other. The journaling of the ends of the top arms imparts great ease of motion, and the spring is rendered much more durable and less apt to break or twist than if the ends were fixed. The bars 8 and 9 being a considerable distance apart afford a good substantial platform. The spring enables me to apply to the gear a body of any width, and as there are springs at each corner of the body it is held level without liability to rock.

Instead of having the springs at the front and back of the same construction I may use my improved spring at one end only of the vehicle, and may use an elliptic spring or a spring of other construction at the other end. The arms of the springs at the opposite sides of the vehicle may also be set at an angle instead of being parallel, as shown, and instead of the suspension-bars 10 10' other means of suspension may be used. Other modifications may be made.

I claim—

1. A vehicle-spring comprising two parallel pairs of upper and lower spring-arms, each upper arm being secured to its corresponding lower arm at one end, the lower arms being connected to a transverse suspension-bar on the running-gear of the vehicle, and the ends of the upper arms being transversely connected by cross-bars; substantially as described.

2. A vehicle-spring comprising two parallel pairs of upper and lower spring-arms, each upper arm being secured to its lower arm at one end, the opposite end of each of the lower arms being connected to a transverse suspension-bar on the running-gear of the vehicle, and the upper arms being connected at their forward and rear ends to transverse bars which support the vehicle-body; substantially as described.

3. A vehicle-spring comprising two parallel pairs of upper and lower spring-arms, each upper arm being secured to its lower arm at one end, the opposite end of each lower arm being connected to an elevated transverse bar on the running-gear of the vehicle, and the upper arms being connected at their corresponding ends by transverse bars which support the vehicle-body; substantially as described.

4. A vehicle-spring comprising two parallel pairs of upper and lower spring-arms, each upper arm being secured to its lower arm at one end only, the opposite ends of the lower arms being attached to transverse, elevated suspension-bars on the running-gear of the vehicle, and the upper arms being pivotally secured to transverse bars which support the vehicle-body; substantially as described.

5. A vehicle-spring comprising parallel pairs of upper and lower spring-arms, each upper arm being secured to its corresponding lower arm at one end, the opposite end of each of said lower arms being connected to a single transverse suspension-bar on the running-gear of the vehicle, and the respective ends of the upper arms being connected to a pair of transverse bars which support the vehicle-body; substantially as described.

6. A vehicle-spring comprising upper and lower spring-arms extending longitudinally of the vehicle-body, the upper arm being secured at one of its ends to the corresponding end of its paired lower arm and both arms thereby pivotally connected to a supporting-bar extending transversely of the vehicle-body, the lower arm and upper arm each having means for connecting their separated ends to transverse bars on the running-gear and vehicle-body, respectively; substantially as described.

7. A compound vehicle-spring comprising two members, each consisting of a pair of leaf-springs connected together at one end only and lying in substantially the same vertical plane, the free ends of the upper springs and the joined ends of each pair of springs being pivotally attached to transverse, body-supporting bars, a transverse bar supported above one of the vehicle-axles, and means for attaching the free ends of the lower springs to said last-mentioned bar; substantially as described.

In testimony whereof I have hereunto set my hand.

CHARLES A. BEHLEN.

Witnesses:
S. T. PEACE,
C. S. EASTON,
W. C. BRYAN.